United States Patent
Strother et al.

(10) Patent No.: US 8,579,181 B2
(45) Date of Patent: Nov. 12, 2013

(54) METHOD OF FORMING AN INTERNAL STRUCTURE IN A HOLLOW COMPONENT

(75) Inventors: Oliver Michael Strother, Leeds (GB); Keith Christopher Goldfinch, Bristol (GB)

(73) Assignee: Rolls-Royce PLC (GB)

(*) Notice: Subject to any disclaimer, the term of this patent is extended or adjusted under 35 U.S.C. 154(b) by 452 days.

(21) Appl. No.: 12/720,351

(22) Filed: Mar. 9, 2010

(65) Prior Publication Data

US 2010/0236711 A1  Sep. 23, 2010

(30) Foreign Application Priority Data

Mar. 18, 2009 (GB) .................................. 0904572.5

(51) Int. Cl.
*B23K 31/02* (2006.01)
*B23K 20/00* (2006.01)
*B23P 6/00* (2006.01)
*B21D 53/48* (2006.01)
*B21K 3/04* (2006.01)

(52) U.S. Cl.
USPC .......... 228/157; 228/118; 228/193; 29/889.1; 29/889.7; 29/889.72

(58) Field of Classification Search
USPC .............. 228/141.1, 146, 153, 158, 161, 118, 228/157, 193; 29/889.7, 889.1, 889.72, 29/889.721; 72/58, 61, 709
See application file for complete search history.

(56) References Cited

U.S. PATENT DOCUMENTS

| | | |
|---|---|---|
| 2,916,808 A | 12/1959 | Wilkes, Jr. |
| 3,927,817 A | 12/1975 | Hamilton et al. |
| 3,936,920 A * | 2/1976 | Conn, Jr. .................... 29/889.72 |
| 4,043,498 A * | 8/1977 | Conn, Jr. ....................... 228/265 |
| 4,292,375 A | 9/1981 | Ko |
| 4,530,197 A * | 7/1985 | Rainville ................... 52/783.15 |
| 5,243,758 A * | 9/1993 | LeMonds et al. .......... 29/889.72 |
| 6,418,619 B1 * | 7/2002 | Launders ..................... 29/889.7 |
| 7,640,661 B2 * | 1/2010 | Despreaux et al. .......... 29/889.7 |
| 2009/0016894 A1 * | 1/2009 | Strother ..................... 416/241 R |
| 2009/0057488 A1 * | 3/2009 | Goldfinch et al. ....... 244/123.14 |
| 2010/0221117 A1 * | 9/2010 | Brennand et al. ......... 416/229 A |
| 2010/0239427 A1 * | 9/2010 | Strother .................... 416/229 A |
| 2011/0182744 A1 * | 7/2011 | Strother et al. ............... 416/232 |
| 2011/0274551 A1 * | 11/2011 | Iwasaki ......................... 416/224 |

FOREIGN PATENT DOCUMENTS

| | | |
|---|---|---|
| EP | 1013355 | 6/2000 |
| EP | 2014384 | 1/2009 |
| GB | 2261032 | 5/1993 |
| GB | 2397855 | 8/2004 |
| GB | 2401407 | 10/2004 |
| GB | 2450935 | 1/2009 |
| GB | 2450937 A | 1/2009 |
| WO | 9727045 | 7/1997 |

* cited by examiner

*Primary Examiner* — Kiley Stoner
*Assistant Examiner* — Carlos Gamino
(74) *Attorney, Agent, or Firm* — McCormick, Paulding & Huber LLP

(57) ABSTRACT

A method of forming an internal structure in a hollow component that includes the steps of forming an assembly having first, second, and third plates the first and second plates each with a substantially planar surface and a surface that includes at least one protrusion and is on the exterior facing surfaces of the assembly. The third plate is sandwiched between the first and second plates. The method also includes the steps of selectively bonding portions of the third plate to sections of the first and second plates substantially opposite the at least one protrusions of the first and second plates; and forming the assembly against a die such that the at least one protrusions of the first and second plates are transferred from the exterior facing surfaces to the interior facing surfaces of the first and second plates.

15 Claims, 1 Drawing Sheet

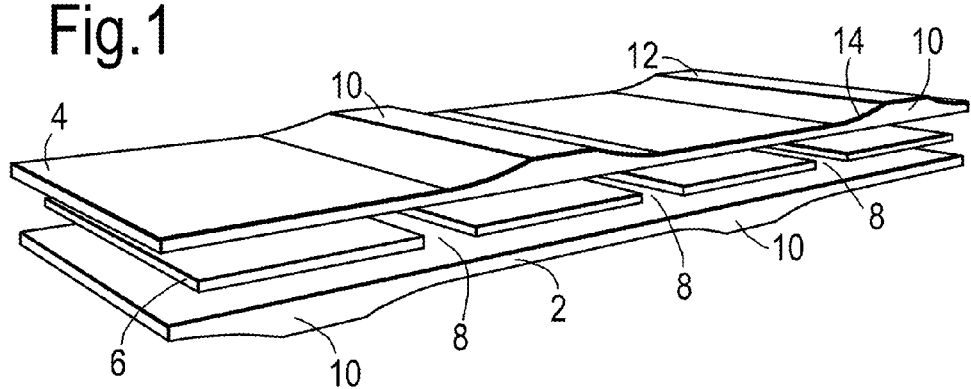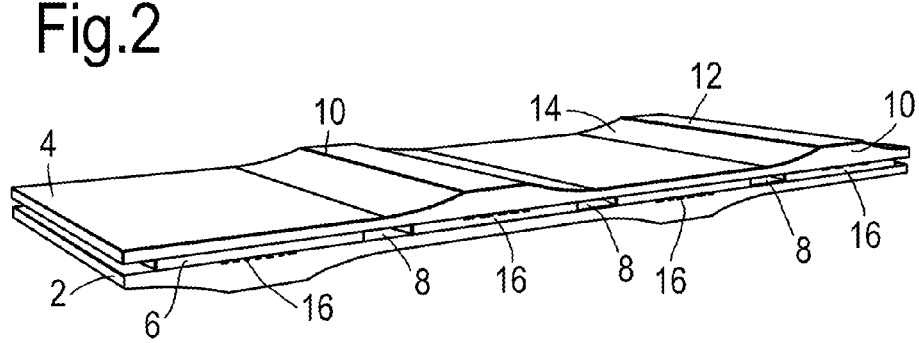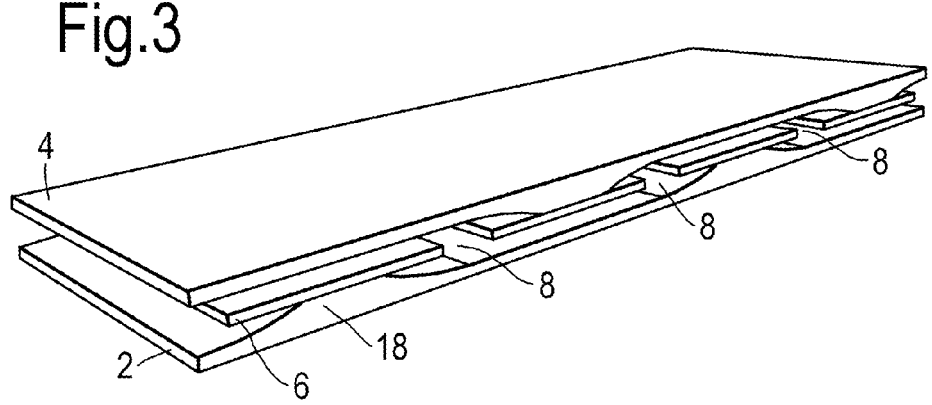

METHOD OF FORMING AN INTERNAL STRUCTURE IN A HOLLOW COMPONENT

CROSS REFERENCE TO RELATED APPLICATION

This application is entitled to the benefit of British Patent Application No. GB 0904572.5, filed on Mar. 18, 2009.

FIELD OF THE INVENTION

This invention relates to a method of forming an internal structure in a hollow component, and particularly but not exclusively relates to applications of the method in hollow aerofoil components for turbomachines.

BACKGROUND OF THE INVENTION

It is known to manufacture hollow metallic aerofoils for example to be used as blades in a jet engine, and in particular fan blades for a turbomachine, by superplastic forming and diffusion bonding metallic panels, the panels forming pressure and suction surfaces of the blade. These blades are generally referred to as wide-chord fan blades. These structures are widely used in the civil aerospace industry and may also be used in blisks, particularly in military applications. The metallic panels may include elementary metal, metal alloys and metal matrix composites. At least one of the metallic panels must be capable of superplastic extension. In one known process the surfaces of the panels to be joined are cleaned, and at least one surface of one or more of the panels is coated in preselected areas with a stop-off material to prevent diffusion bonding. The panels are arranged in a stack and the edges of the panels are welded together to form an assembly. The assembly is placed in a pressure vessel and is heated and pressed to diffusion bond the panels together to form an integral structure. Diffusion bonding occurs when two mating surfaces are pressed together under temperature, time and pressure conditions that allow atom interchange across the interface. The integral structure is located between appropriately shaped dies and is placed within an SPF press. The integral structure and dies are heated and pressurised gas is supplied into the interior of the integral structure to cause at least one of the panels to be superplastically formed to produce an article matching the shape of the dies.

In addition to the hollow assembly just described, it is also known to insert a membrane between the metallic panels prior to the above-described process. The location of diffusion bonds between the membrane and the adjacent panels can be controlled by applying the stop-off material to preselected areas on each side of the membrane (or respective panels). When the aerofoil is subsequently expanded, the membrane adheres to the panels where the diffusion bond is allowed to form and thereby provides an internal structure. The internal structure is provided to increase the strength and stiffness of the aerofoil and also to prevent lateral flexing of the panels, referred to as "panting".

The assembly may be filled or part filled by a suitable material to provide damping of the structure and therefore to reduce vibration. A suitable material may be one, which possesses viscoelastic properties. Viscoelasticity is a property of a solid or liquid which when deformed exhibits both viscous and elastic behaviour through the simultaneous dissipation and storage of mechanical energy. A known method is to introduce a viscoelastic material, for example a Huntsman™ syntactic damping paste or some such similar product, into the cavity by injecting or otherwise introducing the material into some or all of the cavity. This technique may be applied in a hollow assembly wherein the cavity is smooth walled with no internal structure, for example, see patent application number GB2371095. In this configuration the viscoelastic material is restrained solely by the bond between the viscoelastic material and the walls of the cavity. If this bond is not sufficient to retain the viscoelastic material during working conditions, in particular centrifugal loading, then, since the viscoelastic material is a parasitic mass, which is unable to support its own weight, the hydrostatic load of the unrestrained material will cause the blade to fail rapidly. Accordingly, the consequences of failure of this bond are severe. It is therefore desirable to provide some form of mechanical keying as an alternative or additional means of retaining and restraining the viscoelastic material. An internal structure, for example as described above, may be used to provide such a restraining or retaining effect on the injected material. However by providing a rigid internal structure the benefits of damping the aerofoil may be reduced as the aerofoil is less flexible as a result of the internal structure. This may lead to additional problems where the aerofoil prematurely fatigues or cracks as a result of the reduced flexibility. Other configurations use internal ribs, which may be attached to alternate interior walls of the aerofoil but which are not connected to one another, for example see patent application number GB2450934. This configuration permits damping of the assembly whilst the re-entrant features still provide a means of retaining the injected material. Other methods use dual membranes to produce a lightweight internal structure in the aerofoil.

The internal structure is such that it may advantageously bear a significant load under normal working conditions which allows the thickness of the panels to be reduced and the size of the cavity to be increased. Also the internal structure may provide additional birdstrike resistance. However the use of an internal structure to physically restrain the viscoelastic material inevitably adds weight to the aerofoil and thus increases the stresses on the aerofoil, in particular at the root of the aerofoil. This increases the blade off energy if the blade were to fail, which must be taken into account when designing the blade retention system. In addition the provision of complex internal structures increases manufacturing costs and lead times. It is therefore desirable to provide an improved method of restraining a viscoelastic material within a cavity which addresses some or all of the above problems associated with the prior art methods.

SUMMARY OF THE INVENTION

In accordance with a first aspect of the present invention there is provided a method of forming an internal structure in a hollow component, the method including the steps of forming an assembly having first, second, and third plates, the first and second plates each including a substantially planar surface and a surface with at least one protrusion, the surfaces having the at least one protrusion being on the exterior facing surfaces of the assembly. The third plate being sandwiched between the first and second plates. The method also having the steps of selectively bonding portions of the third plate to sections of the first and second plates substantially opposite said at least one protrusions of the first and second plates; forming the assembly against a die such that the at least one protrusions of the first and second plates are transferred from the exterior facing surfaces to the interior facing surfaces of the first and second plates.

The step of forming the assembly may also have the step of subjecting the assembly to elevated heat and pressure conditions, which may cause superplastic or blow forming.

The at least one protrusion of the first and second plates may be offset from one another.

The at least one protrusion of the first and second plates may be arranged along the length of the plates in an alternating arrangement.

Selectively bonding may include diffusion bonding.

The at least one protrusions may extend along the whole or a portion of the width of the first and second plates.

The protrusion may include a web and flanges either side of the web. The web may be substantially planar and the flanges may be concave.

The selectively bonded portions may be substantially opposite to the web of the at least one protrusion and may be substantially the width of the web of the protrusion.

The surfaces of the die which engage the assembly may be substantially planar. The substantially planar surfaces of the die may initially contact the webs only of the first and second plates.

The third plate may be provided with at least one opening through the thickness of the plate.

The at least one opening may be provided in between the bonded portions.

The at least one opening may be a slot.

The third plate may be thinner than the first and second plates and form a membrane between the plates. The first and second plates may be between 2 to 7 mm thick and the third plate may be between 0.3 and 1.5 mm thick.

The method may further have the step of introducing a damping material into the hollow component. The damping material may be a viscoelastic material. The internal structure may be adapted to restrain the damping material.

For a better understanding of the present invention, and to show more clearly how it may be carried into effect, reference will now be made, by way of example, to the accompanying drawings.

BRIEF DESCRIPTION OF THE DRAWINGS

FIG. 1 shows a perspective view of a cross-section through component parts which may be used in a method of forming an internal structure in a hollow component in accordance with a first embodiment of the invention;

FIG. 2 shows a perspective view of a cross-section through the component parts of FIG. 1 following assembly; and FIG. 3 shows a perspective view of a cross-section through the assembly of FIG. 2 following forming.

DETAILED DESCRIPTION OF THE PREFERRED EMBODIMENTS

FIG. 1 illustrates a method of forming an internal structure within a hollow component in accordance with a first embodiment of the invention. The hollow component may comprise an aerofoil assembly, such as that used as a fan blade or other components of a turbomachine or other suitable applications which shall be described herein. The component is formed from a first plate of a material 2, a second plate of a material 4 and a third plate of a material 6. The material of the first, second and third plates may include elementary metals, metal alloys and metal matrix composites. In particular, one or more of the plates may be made from titanium, although other materials may be used. As shown in FIG. 1 the plates are arranged so that the third plate 6 is sandwiched between the first and second plates 2, 4. The third plate 6 is thinner than the first and second plates 2, 4 and forms a membrane between the plates. The first and second plates are between 2 to 7 mm thick and the third plate is between 0.3 and 1.5 mm thick. The third plate 6 is provided with a plurality of slots 8. The slots 8 may be provided by any suitable means, for example laser cutting or water-jet cutting. The slots 8 extend in a widthwise direction, although as described below other orientations may be used.

The first and second plates 2, 4 are provided with one or more protrusions 10 positioned on an exterior surface of the plates which extend in a widthwise direction. The protrusions 10 may be provided by machining, forging or other suitable methods. Furthermore the protrusions 10 may be integral to the first and second plates 2, 4 or alternatively may be separate components which are subsequently joined to the plates. It is also possible to form the protrusions by an additive process such as direct metal or shaped metal deposition. In this technique a laser is used to melt a region of the plate and metal is supplied to the melted region in powder or wire form and allowed to cool. By repeating the melting, deposition and cooling steps layers are formed that provide the raised projection of desired form. In the illustrated embodiment, the first and second plates 2, 4 are aligned so that the protrusions are orientated substantially parallel to the slots 8. The protrusions 10 comprise a web 12 and flanges 14 on either side of the web 12. The web 12 is substantially planar and the flanges 14 are concave. The concave shape of the flanges 14 acts to prevent stress concentrations at the edges of the protrusions 10. The shape of the protrusions 10 formed by the web 12 and flanges 14 may differ from that shown and may vary along the width of the protrusion or from one protrusion to another. The shape of the protrusions 10 are chosen to provide the resulting component with desirable properties which shall be described in more detail below. The protrusions 10 of the first plate 2 and the protrusions 10 of the second plate 4 are arranged so that they are located at different positions along the length of the plates. The protrusions 10 thus form an alternating pattern such that the protrusions of the second plate 4 fall in between adjacent protrusions 10 of the first plate 2, and vice versa. Although the protrusions 10 of the second plate 4 are shown as falling substantially in the centre of the two adjacent protrusions 10 of the first plate 2, it is envisaged that other patterns may be used wherein the distance between protrusions are not equal and may vary along the length of the assembled plates. Furthermore, the slots 8 are shown as falling substantially between adjacent protrusions 10, however this need not be the case and the position of the slots 8 may vary from that shown and also from one slot to another. The above variations may be advantageous for enabling certain sections of the resulting component to have desired properties, which will be described in more detail below.

FIG. 2 shows the component parts of FIG. 1 after assembly. The third plate 6 is selectively bonded to the inner facing surfaces of the first and second plates at positions along the length of the assembly which are substantially opposite to the protrusions 10 and thus the bonds are arranged along the length of the third plate 6 on alternating surfaces of the plate. The third plate 6 is bonded opposite to the web 12 of the protrusion 10 and along a section of the inner surface of the first and second plates substantially equal to the width of the web 12. The third plate 10 may be bonded by any known method for example brazing or welding, however as described previously it is advantageous to bond the assembly using diffusion bonding. As previously described the diffusion bonding process requires the assembly to be exposed to heat, pressure and time conditions which allow atom interchange. In order to selectively bond only certain areas of the assembly, for example at the areas opposite to the protrusions 6, it is first necessary to apply a stop-off material at the locations where bonding is not required. The stop-off material is selected depending on the material of the plates and for plates manufactured from titanium the stop-off material may be Yttria. The stop-off material may be applied to the internal surfaces of the first and second plates 2, 4 and/or the surfaces of the third plate 6. This may be by means of screen-printing or other known methods of applying the stop-off material and is applied to all surfaces except where bonds are desired. As previously described, the plates are then arranged in a stack and the edges of the plates welded together to form an assembly. A vacuum, or inert gas pressure, is applied to the interior of the assembly. The assembly is then placed in an autoclave and heated so as to "bake out" the binder from the material to prevent diffusion bonding. The assembly is then evacuated and sealed. The sealed assembly is placed in a pressure vessel and is heated and pressed to create diffusion bonds 16 between the plates. The diffusion bonds 16 are at positions which are substantially opposite to the protrusions 10 and thus an integral assembly is formed.

As shown in FIG. 3, the integral assembly is subsequently inflated or expanded. An example of an appropriate method of inflating the assembly is as follows, however other known techniques may be used. The assembly is located between appropriately shaped dies (not shown) and the assembly and dies are heated and pressurised fluid, for example Argon gas, is supplied into the interior of the assembly 2 to cause at least one of the plates to be formed to produce an article matching the shape of the dies. The forming of the plates may be superplastic. The dies comprise substantially planar surfaces which contact the webs 12 of the first and second plates prior to the supply of the pressurised fluid. Following the pressurisation of the assembly, the sections of the first and second plates which were not in contact with the dies are forced against the dies so as to form substantially planar exterior surfaces to the assembly. As a result, the exterior protrusions 10 of the first and second plates are replaced by interior protrusions 18, which are of similar size and shape to the exterior protrusions 10. The exterior protrusions 10 are effectively transferred to the interior surfaces of the plates. As a result a hollow cavity is formed within the assembly. Alternatively, the webs 12 of the first and second plates do not contact the dies prior to the pressurisation of the assembly and accordingly the assembly expands during pressurisation until the webs 12 contact the dies, thus causing the unbonded sections of the third plate 6 to be deformed between the sections of the third plate 6 alternately bonded to the first and second plates by diffusion bonds 16. In this configuration the third plate 6 therefore forms a crenulated structure within the cavity. The exterior protrusions 10 need not be fully transferred to form the interior protrusions 18 and the degree to which the exterior protrusions are transferred depends particularly on the pressure of the pressurised fluid and the thickness of the first and second plates. In certain applications it may be advantageous to only partially transfer the exterior protrusion 10, thus creating an assembly with both interior and exterior protrusions. This may be particularly beneficial in applications where it is desirable to modify the turbulence and/or increase the surface area of the component, such as in a heat exchanger matrix.

The hollow cavity formed following inflation of the assembly is then filled or partially filled with a damping material (not shown), such as a viscoelastic material, as previously described. This may be injected or introduced into the cavity via any suitable means. For example a fill hole may be drilled in the surface of one of the plates to enable to material to be injected into the cavity. The viscoelastic material may be a two-part system, typically epoxy based, which is mixed shortly before being injected into the cavity and chemically sets once it is in place.

The orientation of the interior protrusions 18 and/or slots 8 within the assembly need not be as shown and may extend in the spanwise or chordwise directions of the aerofoil or be angled in any other direction. In addition, their orientation may vary within the aerofoil. For example, near the tip of the aerofoil they may extend substantially parallel to the tip. This may be desirable since the steady stresses at the tip are lower and the parallel configuration maximises strength of the tip against impact caused by, for example, a birdstrike. Towards the root of the aerofoil they may extend substantially parallel to the length of the aerofoil so as to enhance the steady strength of the aerofoil. Furthermore, the method may be employed only in a section or sections of the aerofoil. For example the third plate 6 can be located in a position where damping is required. Typically, this may be approximately a third of the way along the span of the aerofoil. Variations of the damping properties can be achieved by altering the manner in which the third plate is bonded to the first and second plates and also by altering the protrusions provided on the first and second plates.

The re-entrant T-shaped structures formed by the interior protrusions 18, the third plate 6 and the slots 8 in the third plate 6 provide a mechanical key for restraining the damping material. The damping material does not therefore rely solely on a bond or frictional interaction with the interior surfaces of the cavity and is more robustly affixed to withstand working loads, in particular centrifugal loads. In addition, since the first and second plates are not rigidly connected to one another, the aerofoil is provided with some flexibility which enables the damping material to operate effectively. The T-shaped structures divide the hollow cavity into sections extending between the inner surface of the first or second plate and the opposing surface of the third plate. It has been shown that, when filled with a viscoelastic damping material, thinner sections demonstrate a different damping response than that of thicker sections. The present invention provides both thinner sections and also thicker sections created by the slots 8 in the third plate, thus giving the aerofoil areas which exhibit a different damping response, which may be desirable in certain applications. This configuration may be modified extensively to produce the required damping properties. For example, the relative widths of the T-shaped structures and the slots 8 may be modified in order to alter the proportion of the aerofoil with the thinner/thicker section damping properties. Also, the thicknesses of the thin and thicker sections may be changed by altering the dimensions, in particular the height, of the exterior protrusions 10 and/or by altering the extent to which the exterior protrusions are transferred to form interior protrusions 18 so as to produce interior protrusions of the desired dimensions. The resulting interior protrusions 18 may vary from one to another and advantageously may be formed so that the interior protrusions 18 of the first plate 2 are of one height and that the interior protrusions 18 of the second plate 4 are of another height. Therefore the third plate 6 is offset from the centre of the aerofoil along its thickness. This configuration produces different damping properties for each surface of the aerofoil and therefore may be particularly beneficial for use in fan blades wherein the suction surface of the blade is exposed to possible strikes from debris and birds. Modification of these features may also ensure that the damping material is suitably retained within the cavity.

The cutback area defined between the flanges of the interior protrusions and the surface of the third plate act to prevent the damping material from peeling from the inner surfaces of the assembly. During rotation of the aerofoil the loads on the damping material are such that if at one point the damping material is being pulled away from the interior surface of the aerofoil, the change in direction of the surface causes the damping material to be pushed onto the surface thereby limiting peel. The thin sections defined by the T-shaped structures also help to prevent peel of the damping material.

The present invention allows a complicated internal structure to be formed from a flat pack construction. Also the resulting component possess forged material properties which are required for highly stressed rotating structures. The internal structure can be manufactured inside a small cavity of low thickness. Thus the present invention is particularly suitable for manufacturing thin aerofoils which require an internal cavity for damping purposes.

Since the present invention uses only a single membrane between the two outer plates, the ability to retain the damping material is provided without the increase in weight associated with dual membrane designs. This is particularly beneficial in applications relating to fan blades and other rotating parts where increased weight increases loads on the aerofoil and the blade-off energy. This in turn reduces the weight of the disk and the weight of any blade retention system used to secure the blade in the event of a blade-off.

The invention has been described in the application as an aerofoil, in particular for use as a fan blade in a turbomachine, however it should be appreciated that the invention may be used in any component where the retention of a damping material or other material is required. This may include both rotating and static components. For example, the invention may be used to form internal enclosed or vented cavities within hollow fan blades or blisks for civil or military uses. The invention may also be used to form vibration damped static components. Alternative uses of the inventions may be found in structures where materials need to be restrained due to high gravitational or centripetal loading or where high surface areas are required inside a component.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

What is claimed is:

1. A method of forming an internal structure in a hollow component, the method comprising the steps of:
    forming an assembly having first, second, and third plates, the first and second plates each with a substantially planar surface and a surface with at least one protrusion, the surfaces including said at least one protrusion being on the exterior facing surfaces of the assembly, and the third plate being sandwiched between the first and second plates and having multiple slots opening through the third plate to divide the third plate into multiple separate plate portions;
    selectively bonding each plate portion of the third plate to a section of the first or second plates at a bond location substantially opposite one of the at least one protrusions of the first and second plates, wherein the width of each plate portion, extending in a direction from one adjoining plate portion to another adjoining plate portion, is greater than the width of the corresponding bond location in the same direction; and
    forming the assembly against a die such that the at least one protrusions of the first and second plates are transferred from the exterior facing surfaces to the interior facing surfaces of the first and second plates.

2. A method of forming an internal structure in a hollow component as claimed in claim 1, wherein forming the assembly comprises subjecting the assembly to elevated heat and/or pressure conditions.

3. A method of forming an internal structure in a hollow component as claimed in claim 1, wherein forming the assembly is by superplastic forming or blow forming.

4. A method of forming an internal structure in a hollow component as claimed claim 1, wherein the at least one protrusions of the first and second plates are offset from one another.

5. A method of forming an internal structure in a hollow component as claimed in claim 1, wherein the at least one protrusions of the first and second plates are arranged along the length of the plates in an alternating arrangement.

6. A method of forming an internal structure in a hollow component as claimed in claim 1, wherein the step of selectively bonding is by diffusion bonding.

7. A method of forming an internal structure in a hollow component as claimed in claim 1, wherein the at least one protrusions further comprise a web and flanges either side of the web.

8. A method of forming an internal structure in a hollow component as claimed in claim 7, wherein the web is substantially planar and/or the flanges are concave.

9. A method of forming an internal structure in a hollow component as claimed in claim 1, wherein surfaces of the die which engage the assembly are substantially planar.

10. A method of forming an internal structure in a hollow component as claimed in claim 9, wherein the substantially planar surfaces of the die initially contact the protrusions only of the first and second plates.

11. A method of forming an internal structure in a hollow component as claimed in claim 1, wherein at least one slot opening is provided between the bond locations.

12. A method of forming an internal structure in a hollow component as claimed in claim 1, wherein the third plate is thinner than the first and second plates.

13. A method of forming an internal structure in a hollow component as claimed in claim 1, further comprising the step of introducing a damping material into the hollow component.

14. A method of forming an internal structure in a hollow component as claimed in claim 13, wherein the damping material is a viscoelastic material.

15. A method of forming an internal structure in a hollow component as claimed in claim 13, wherein the internal structure is adapted to restrain the damping material.

* * * * *